A. McK. WATERS.
AMUSEMENT DEVICE.
APPLICATION FILED JULY 25, 1919.
1,345,647.
Patented July 6, 1920.
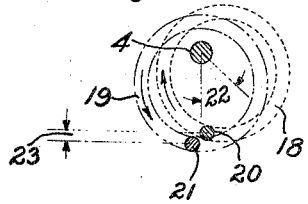
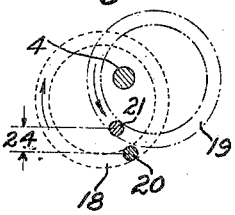
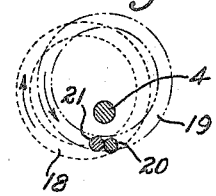
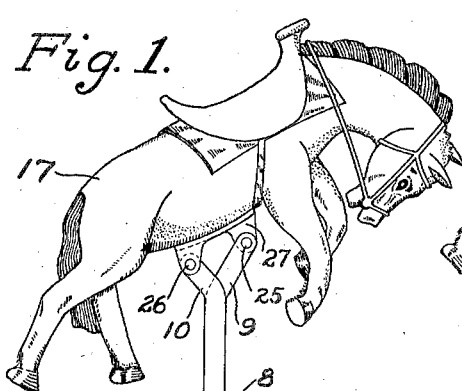
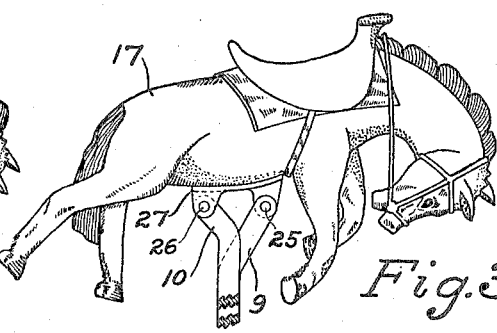
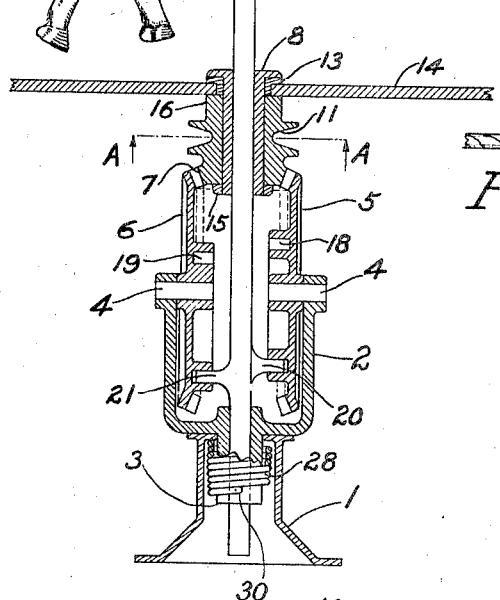
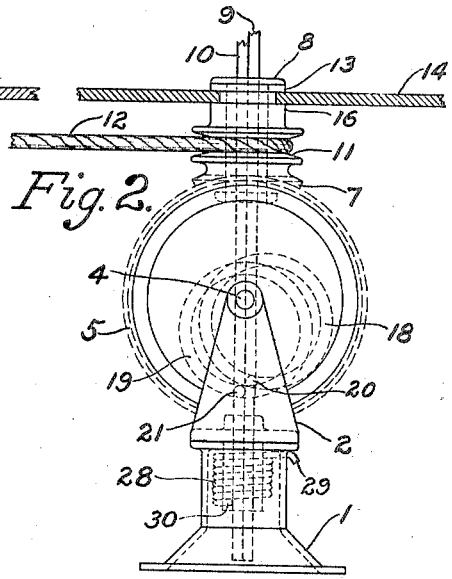
Inventor:
Andrew McK. Waters;
BY Bryan D. Pinkney,
His Attorney.

UNITED STATES PATENT OFFICE.

ANDREW McK. WATERS, OF CINCINNATI, OHIO.

AMUSEMENT DEVICE.

1,345,647.  Specification of Letters Patent.  Patented July 6, 1920.

Application filed July 25, 1919. Serial No. 313,292.

*To all whom it may concern:*

Be it known that I, ANDREW McK. WATERS, a subject of the Kingdom of Great Britain, formerly residing in the Province of New Zealand, and at present residing at Cincinnati, in the county of Hamilton and State of Ohio, have invented certain new and useful Improvements in Amusement Devices, of which the following is a specification.

My invention relates more particularly to improvements in hobby horses, particularly of that type disclosed in my Patent No. 1,197,085, dated September 5, 1916.

Among the objects sought to be accomplished are to provide a hobby horse so constructed and mounted that it is adapted to simulate the actions of a "bucking bronco"; that is so driven and operated that a plurality of hobby horses may be driven from a prime source, the hobby horses being placed and arranged either promiscuously or in a selected order, whereby in my former Patent No. 1,197,085, the hobby horses were placed in concentric circles in relation to a common central source of motive power. In the present invention the hobby horses need not have rotary movement in relation to a central point.

Other objects and advantages will appear as the description progresses.

In the accompanying drawing, in which like reference numerals apply to similar parts, I have shown one of a series of hobby horses that constitutes my improved amusement device, and since the motive power is applied to a sprocket or sheave through the medium of a flexible drive it is manifest that the hobby horses may be placed in any desired position, such as for example, in a circle, in a row (such as horses are arranged for a race), or arranged in multiple rows. By my improved flexible drive the arrangement of the hobby horses can be made to suit any needs, since an endless flexible drive engages the sprocket or sheave of each hobby horse and gets its motive power from any prime source, such as from an electric motor or gasolene engine. I do not wish it to be understood as confining this invention to the disclosures made in said drawing and description, as many variations may be introduced, within the spirit of this invention, as defined in the claims succeeding the said description.

In the accompanying drawing, Figure 1 is a side elevation partially in cross section of a hobby horse mounted upon a swivel supporting pedestal, including the driving means for operating a hobby horse; Fig. 2, a front view of the supporting pedestal and driving means; Fig. 3, a side elevation of the hobby horse in the high position, and tilted differently than that shown in Fig. 1; Fig. 4, a cross section through the sheave, taken at A—A, Fig. 1; Fig. 5, a diagram illustrating the low position of the cams; Fig. 6, a diagram illustrating the half way position of the cams; Fig. 7, a diagram illustrating the high position of the cams.

In detail the construction illustrated in the drawing includes the supporting base 1, for the vertical swivel stem 2 which is pivotally mounted in the said supporting base 1, and guided in said supporting base by the hub 3. The vertical swivel base 2, preferably in the form of a clevis, has studs 4 rigidly mounted therein, and on which said studs are rotatably mounted the geared cams 5 and 6 respectively. Rotary movement is applied to the geared cams 5 and 6 through the medium of a pinion 7, rotatably mounted on a sleeve 8, through which sleeve pass the hobby horse operating bars 9 and 10 respectively. I have shown a sheave 11 as being integral with the pinion 7. Motive power is applied to the sheave through the medium of a flexible cable 12, which is driven from any suitable prime source, such as an electric motor or gasolene engine, and hence not shown in the drawing.

The sleeve 8 is pivotally mounted in a thimble 13 which is rigidly mounted in the operating floor or platform 14, as said floor or platform usually is of wood. At the lower end of sleeve 8 is a collar 15 which holds the bevel pinion 7 in correct mesh with the teeth of the geared cams 5 and 6. I have shown the extended shoulder 16 of such length that it acts as a top thrust against the thimble 13.

The horse 17 is caused to teeter or tilt by the differences of travel of the operating bars 9 and 10, due to their operative engagement with the cam races 18 and 19, respectively. This difference may be relative, as by advancing the position of the geared cam 5 in reference to the geared cam 6, or vice versa, or it may be actual, by having two distinct cam races 18 and 19, each sufficiently different in shape to give the desired results. A projection 20 of the operating bar 9 works in the cam race 18, and a projection 21 of the operating bar 10 works in the cam race 19. The geared cams 5 and 6 not only teeter or tilt the horse 17 but raise or lower the horse at the same time, thus the tilting is simultaneous with the upward and downward travel of the horse. The amount of upward travel of the horse 17 is determined by the amount of eccentricity of the cam races 18 and 19, and the amount of teeter determined either by the relative differences of the angular displacement of the cam races 18 and 19 or by having differently shaped cam races.

For the purpose of illustration I have shown the cam races 18 and 19 as being of the same shape but with sufficient relative angular displacement to give the necessary amount of teeter. The words teeter and tilt are used synonymously. The relative angular displacement is illustrated by the diagrams Figs. 5, 6 and 7. In Fig. 5 the cam race 18 is set at an angle 22 with cam race 19 and hence this gives a vertical difference 23 in the positions of the projections 20 and 21, with the projection 21 below projection 20. In Fig. 6 each cam race has traveled through an angular space of forty-five degrees, the cam race 18 rotating "clockwise", and the cam race 19 rotating "contra-clockwise", and in this position there is a vertical difference 24 in the positions of the projections 20 and 21, with the projection 20 below projection 21. In Fig. 7 each cam race has traveled through an angular space of ninety degrees (in reference to Fig. 5), and in this position there is practically no difference in the vertical positions of the projections 20 and 21. Hence the teetering movement corresponds to the vertical relative differences of the travel of the projections 20 and 21, and the upward movement of the horse 17 corresponds to the actual vertical travel of the projection 20, since I have illustrated the operating bar 9 as being pivotally mounted on stud 25 which corresponds with the "center of teeter" of the horse 17. Operating bar 10 is pivotally mounted on stud 26, and studs 25 and 26 are rigidly mounted in a bracket 27 having suitable extended members in which the studs 25 and 26 are mounted. The relative differences of travel of the projections 20 and 21 cause the horse 17 to teeter, and when projection 20 is above projection 21 (as in Fig. 5) the horse's head is elevated, and when the projection 21 is above the projection 20 (as in Fig. 6) the horse's tail is elevated, and when projections 20 and 21 (as in Fig. 7) are in the same vertical position the position of the horse is normal. The cam races 18 and 19 can be so placed that any combination of "teeter-movements" may be arranged, and any amount of teeter obtained: thus a realistic simulating of the plunging of a "bucking horse" is hereby effected.

It is evident that the resistance that cam gears 5 and 6 meet in raising and teetering the horse will tend to lock said cam gears and rotate the vertical swivel stem 2 in the supporting base 1, in the direction of the rotation of the bevel pinion 7; to counterbalance this effect the torsion spring 28 is provided. The spring 28 encircles the hub 3 within the chambered supporting base 1, and having one end 29 fixed in the supporting base and the opposite end 30 fixed to the hub 3. When the torsional resistance of the spring 28 becomes greater than the resistance opposed to the cam gears 5 and 6, the vertical swivel stem 2 will be held relatively stationary (the spring 28 then being "wound" or at its greatest tension) and the cam gears 5 and 6 will rotate at equal velocities, causing the raising of the horse and the teetering to occur in regular order. At uncertain or irregular intervals, due to a releasing of the friction of the moving parts or less resistance momentarily offered by the rider, the tension of the spring 28 will be released and will unwind, and this causes the horse with the coacting operating bars 9 and 10 to turn or swing horizontally in respect to the pivotal point in the supporting base 1. This turning movement of the operating bars 9 and 10 effects the relative positions of the projections 20 and 21 in respect to the cam races 18 and 19. It is evident that a relative retarding of cam gear 5 will slow up the rising and lowering action of the horse and accelerate the teetering action of the horse by the counteraction of the speeding up of the cam gear 6, the effect produced on the rider being that of riding a plunging horse, very closely simulating the natural action of a "bucking" horse. As the relative speeds of the cam gears return to normal which normal position is when spring 28 is at its greatest tension or "wound" there will be a corresponding speeding up of the rising and lowering action and a slowing down of the teetering action, producing a "bucking" effect, the severity of which may be regulated by the stiffness of spring 28 which spring regulates the amount of horizontal swing of the vertical swivel stem 2. As the unwinding of the spring 28 may occur at any moment, and the interval of unwinding is irregular, the "buckings" will take the rider unawares, as do the "buckings" of a live "bucking bronco". For "rough riders" no amount of "bucking" will be too severe, and the amount of "bucking" can be regulated by spring 28, using a spring of the required torsional stiffness. For children, the supporting base 1 and the vertical swivel stem 2 may be locked together by any suitable means so that no horizontal movement results, and all movements of the horse will be of the vertical swivel stem 2 regular and the "bucking" action eliminated.

Having thus described my invention what I claim as new and desire to secure by Letters Patent, is:—

1. An amusement device, including a base, a supporting pedestal swiveled in said base, means to simultaneously raise or lower and tilt said amusement device, and torsion means connecting said base and said supporting pedestal.

2. An amusement device, including a base, a supporting pedestal swiveled in said base, means journaled on said supporting pedestal for raising and lowering said amusement device, means journaled on said supporting pedestal for tilting said amusement device, and means for simultaneously operating the two afore-mentioned means.

3. An amusement device, including a base, a supporting pedestal swiveled in said base, driving means to simultaneously raise or lower and tilt said amusement device, and a grooved sheave connected with said driving means for operating said amusement device.

4. An amusement device, including a base, and a supporting pedestal swiveled in said base; a geared cam journaled on said supporting pedestal to raise and lower a vertical operating bar with a projection engaging a race in said geared cam that raises and lowers the amusement device; a second geared cam journaled on said supporting pedestal to raise and lower a second vertical operating bar with a projection engaging a race in said second geared cam that tilts the said amusement device; and, a bevel gear integral with a driven sheave mounted on a vertical sleeve to simultaneously operate the two afore-mentioned means.

In testimony whereof I affix my signature.

ANDREW McK. WATERS.